United States Patent [19]

Harsch et al.

[11] Patent Number: 4,860,879
[45] Date of Patent: Aug. 29, 1989

[54] PLATE BAR LOADING SYSTEM INCLUDING AN AUTOMATIC PACKET OR PLATE BAR STACK ALIGNMENT STATION

[75] Inventors: Erich Harsch, Weingarten; Franz Gaissmaier, Schlier, both of Fed. Rep. of Germany

[73] Assignee: Maschinenfabrik Mueller-Weingarten AG, Weingarten, Fed. Rep. of Germany

[21] Appl. No.: 92,097

[22] Filed: Sep. 20, 1987

[30] Foreign Application Priority Data

Sep. 3, 1986 [DE] Fed. Rep. of Germany ....... 3630141

[51] Int. Cl.⁴ .............................................. B65G 47/24
[52] U.S. Cl. ..................................... 198/395; 198/376
[58] Field of Search ............... 198/374, 375, 376, 379, 198/414, 463.2, 463.3, 464.2, 502.2, 502.3, 394, 395; 414/113, 757, 28; 271/227; 33/395

[56] References Cited

U.S. PATENT DOCUMENTS

| | | | |
|---|---|---|---|
| 3,247,981 | 4/1966 | Johnson | 198/374 X |
| 3,295,660 | 1/1967 | Nelson | 198/414 |
| 3,360,262 | 12/1967 | Kekopoulos et al. | 198/394 X |
| 3,939,993 | 2/1976 | Lingl, Jr. | 198/379 X |
| 4,511,242 | 4/1985 | Ashbee et al. | 198/394 X |

FOREIGN PATENT DOCUMENTS

| | | | |
|---|---|---|---|
| 2205153 | 8/1973 | Fed. Rep. of Germany | 198/414 |
| 0093848 | 6/1982 | Japan | 271/227 |
| 0273214 | 12/1986 | Japan | 198/395 |
| 1302900 | 1/1973 | United Kingdom | 198/414 |

Primary Examiner—Frank E. Werner
Assistant Examiner—Lyle K. Kimms
Attorney, Agent, or Firm—Spencer & Frank

[57] ABSTRACT

A station for aligning a stack or packet of sheet metal or plate bars to be transported to and unstacked at an unstacking station prior to being pressed or processed at a pressing or processing station. The alignment station includes a transporting carriage equipped with a chain conveyor system and a lifting and turning device as well as a stationary measuring system. The measuring system serves to detect the angular position of the sheet metal packet disposed on the transporting carriage and is composed of a rotatably mounted measuring ruler which is placed against the sheet metal packet by means of a pneumatic cylinder. The angular position is measured by way of an absolute value sensor installed at the pivot point of the measuring ruler and is compared with the desired value stored in a control system.

9 Claims, 11 Drawing Sheets

PLATE BAR LOADING SYSTEM INCLUDING AN AUTOMATIC PACKET OR PLATE BAR STACK ALIGNMENT STATION

BACKGROUND OF THE INVENTION

The invention relates to a device for unstacking and transporting stacks of plate bars or plate bars, respectively, to a pressing or processing line, with the unstacking station being preceded by a station for aligning the packet of sheet metal or plate bars.

Such devices are required to feed the plate bars by way of subsequently arranged intermediate stations into the working chamber of a processing machine, e.g. an automatic pressing line.

The drawbacks of the prior art devices are, in particular, the extremely complicated manner in which the packet of sheet metal is placed, and primarily in that this packet of sheet metal weighing from 10 to 12 tons, sometimes even more, must be placed in the correct position, i.e. in the x and y directions, and in the proper position with respect to its vertical axis of rotation.

SUMMARY OF THE INVENTION

This is where the present invention comes in whose object it is to provide an alignment station in which any desired packets of sheet metal can be aligned without much effort in the proper position, as described above. This is accomplished in a device of the above-described configuration in that the alignment station is composed of a stationary measuring system and a transporting carriage receiving the sheet metal packet to be aligned. A lifting and turning device is installed in the transporting carriage to lift the sheet metal packet from a chain conveyor and turn it into the correct position. A rotatably mounted measuring ruler is placed against the sheet metal packet by means of a pneumatic cylinder. The angle through which rotation of the sheet metal packet is to take place is determined by comparing an actual angle of the packet with a desired value stored in the control system, using an absolute value sensor. Then the sheet metal packet is turned until the measuring ruler indicates a measured value at the absolute value sensor which value is identical with the desired value stored in the control system.

The measuring ruler is structurally arranged in such a manner that it is able to be rotated, due to its rotatable suspension, to all four sides of the sheet metal packet, i.e. all four sides of the sheet metal packet can be scanned. Moreover, the entire measuring device can additionally be set off center for asymmetrical metal sheets.

In order to always be able to scan the most favorable edge of the sheet metal packet (by placing the ruler against the edge), the guide system for the measuring ruler is rotatably suspended in the axis of rotation above the sheet metal packet and can be positioned in any angular position by way of a program. Additionally, the entire measuring system is laterally displaceable.

With this structural configuration, the position of the sheet metal packet can be scanned from all four sides and, with appropriately shaped plate bars, lateral displacement can produce a suitable, i.e. straight, measuring edge at the packet.

The lifting and turning device in the transporting carriage serves to turn the sheet metal packet into the correct angular position, with the required turning angle being determined by the measuring system by way of an electronic evaluation system.

BRIEF DESCRIPTION OF THE DRAWINGS

One embodiment of the invention is illustrated schematically in the drawing figure.

It is shown in.

DESCRIPTION OF THE PREFERRED EMBODIMENT

Figure 1:
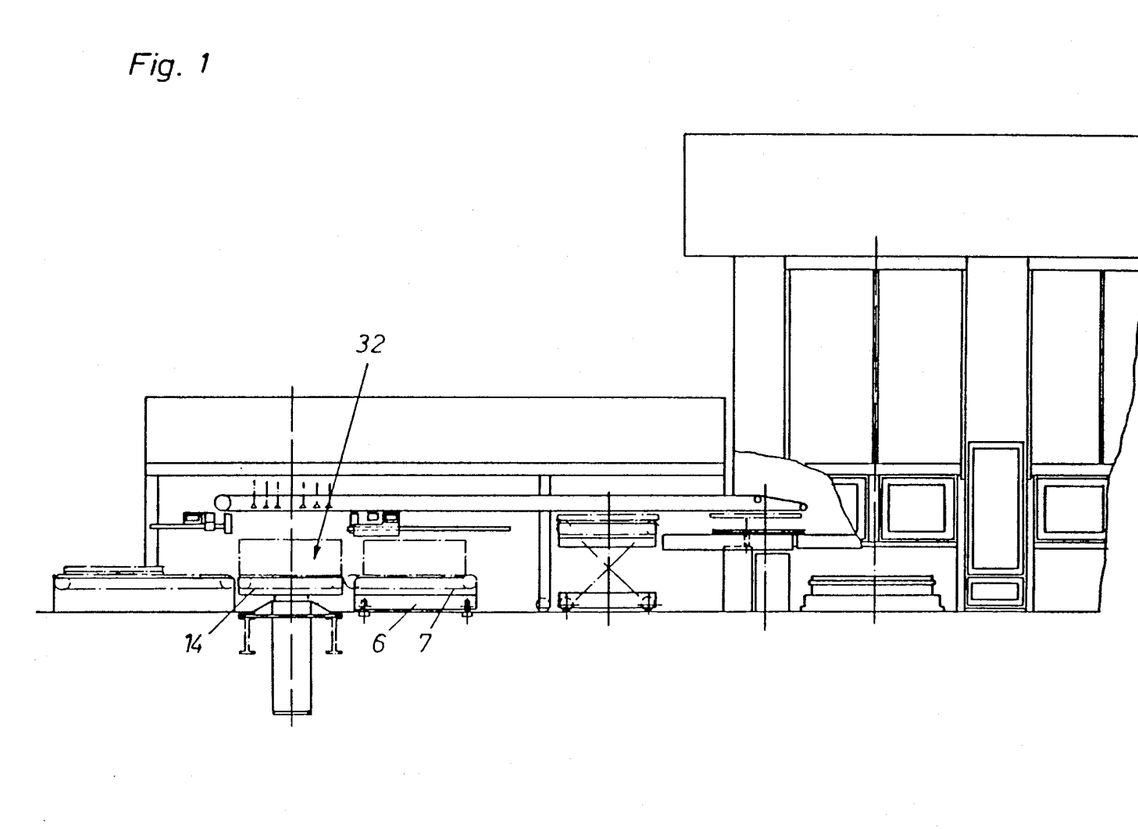
FIG. 1, an overall view of the loading device.
Figure 2:
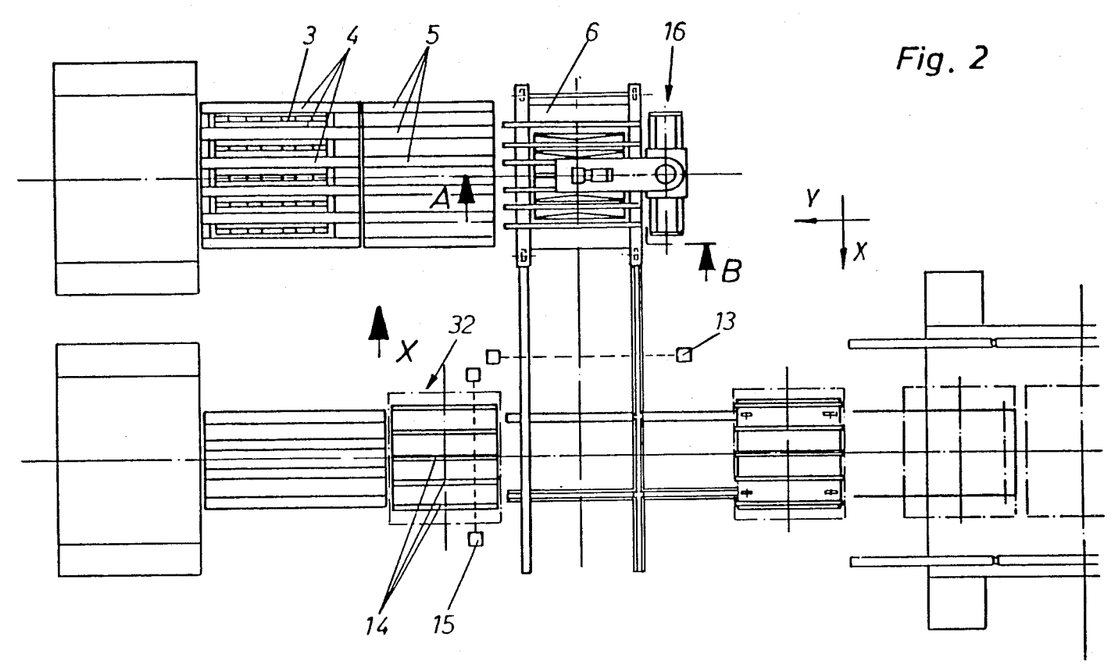
FIG. 2, a top view of the loading device.
Figure 3:
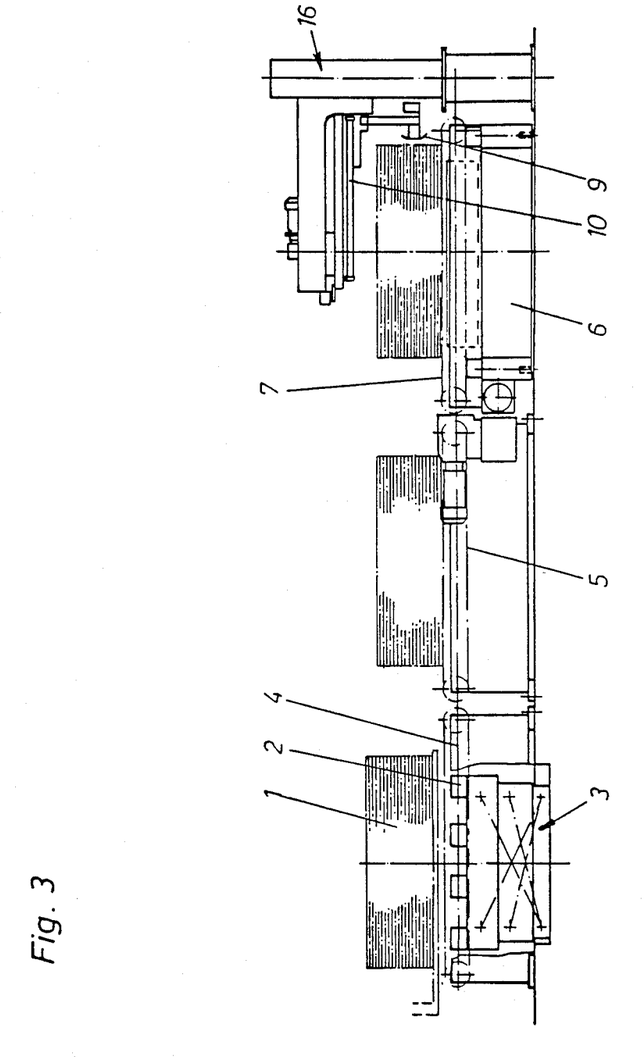
FIG. 3, a view seen in the direction of arrow x.

The device operates as follows:

Referring to FIGS. 2 and 3, the packet of sheet metal 1 is deposited by means of a crane or fork lift on the support strips 2 of the lifting station 3 of a conveyor system 4.

After removal of the Signode metal straps, the lifting mechanism of lifting station 3 lowers stack 1 to the chain conveyor of conveyor system 4. From there, sheet metal packet 1 is transported via chain conveyor 4 to buffer path 5 or to transporting carriage 6, respectively.

Figure 4:
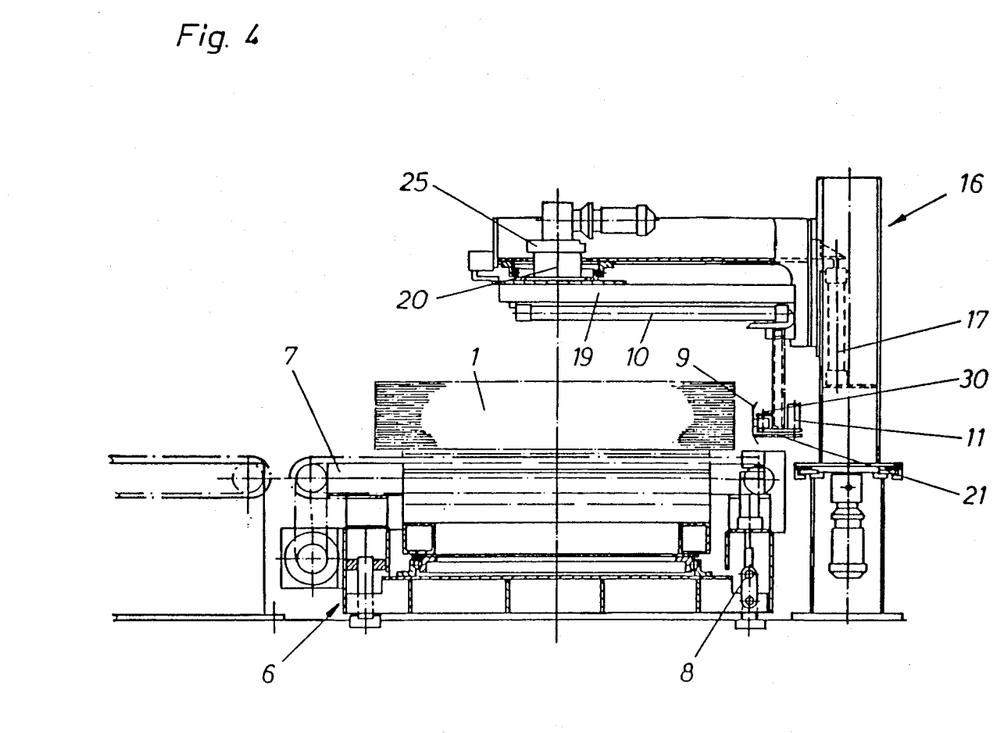
FIG. 4, a sectional view along line A—B of FIG. 2.
Figure 5:
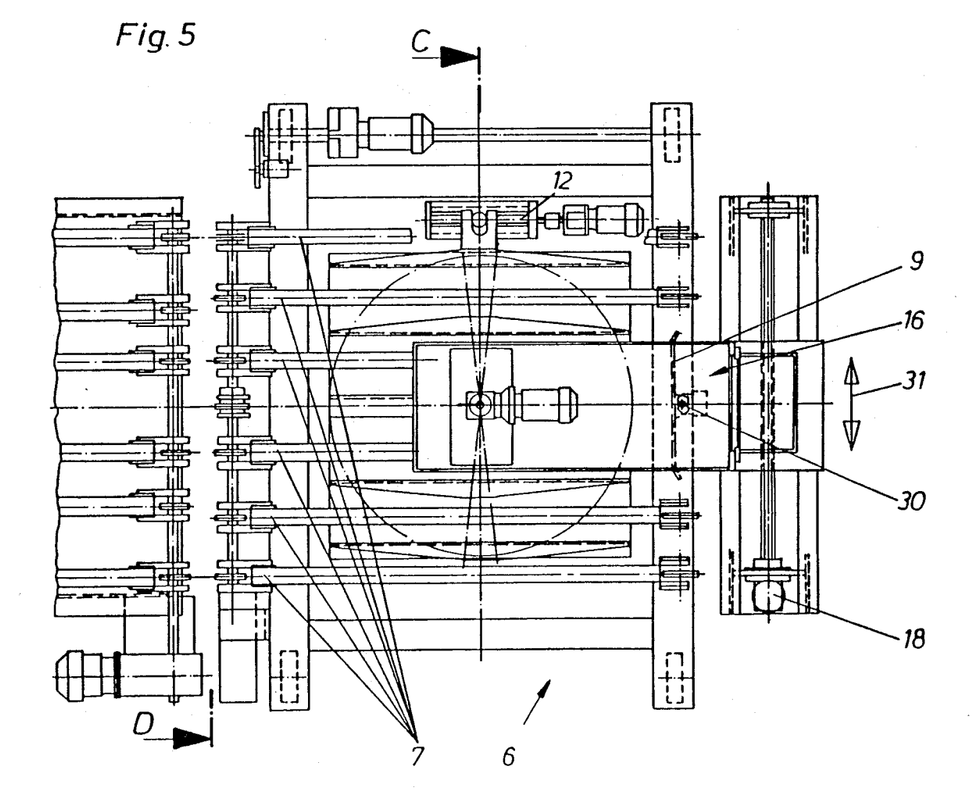
FIG. 5, a top view according to FIG. 4.
Figure 6:
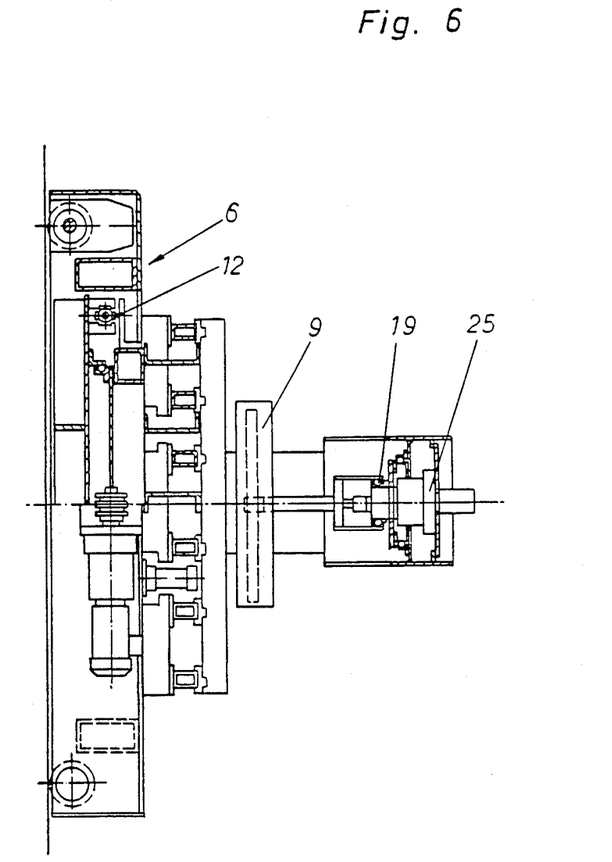
FIG. 6, a sectional view along line C-D of FIG. 5.
Figure 7:
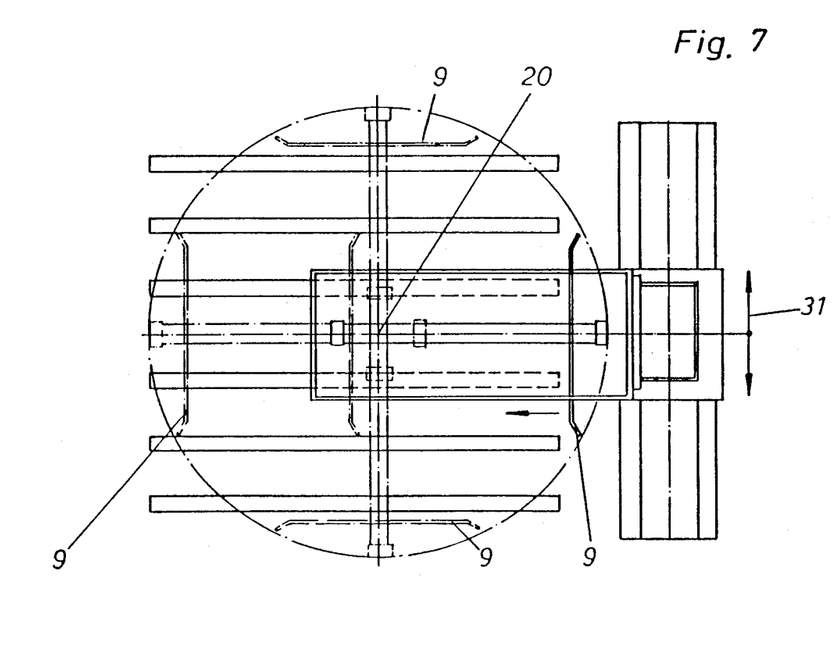
FIGS. 7-11, views from the top onto the alignment station with examples of different possibilities of adjusting the measuring ruler.
Figure 8:
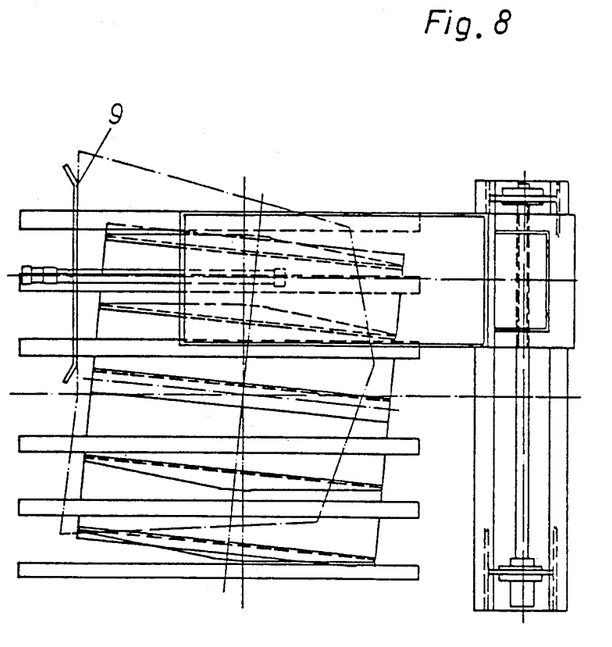
Figure 9:
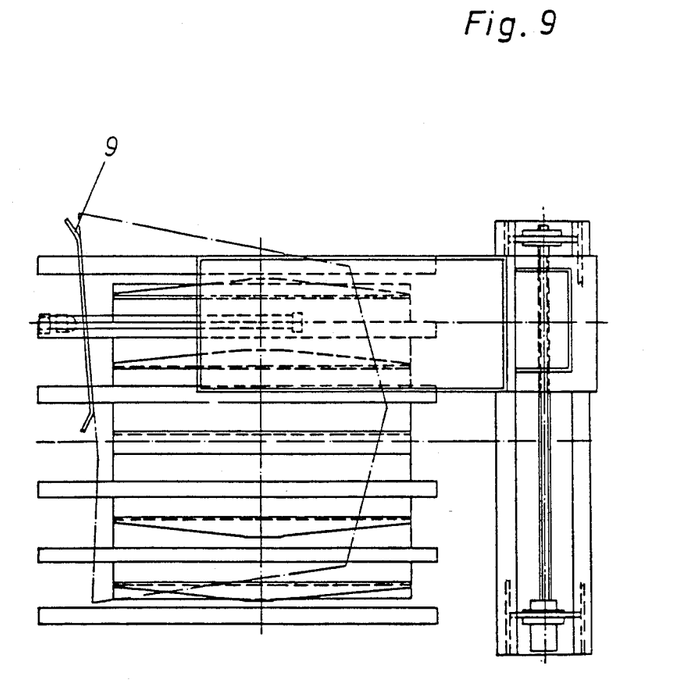
Figure 10:
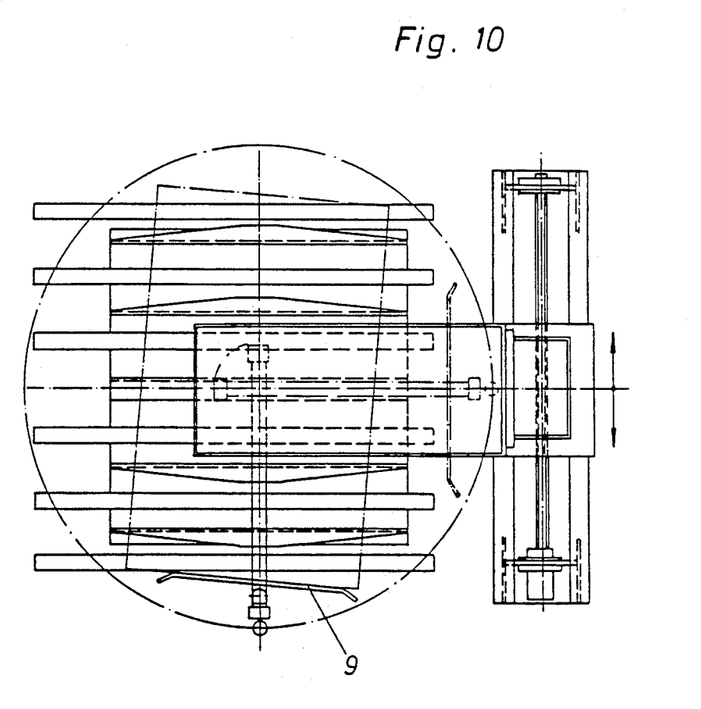
Figure 11:
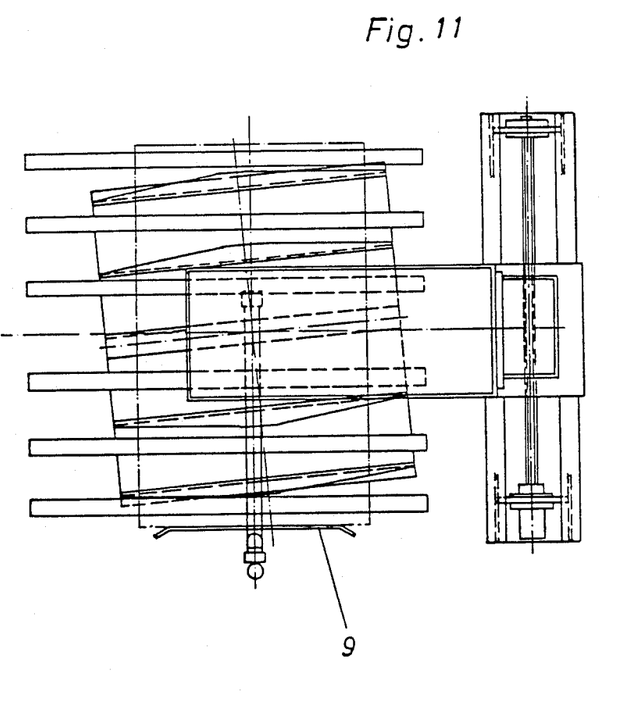

By the action of preselectable proximity switches in chain conveyor 7 of transporting carriage 6, packet 1 stops at approximately the middle of the carriage. As shown in FIG. 4, now lifting mechanism 8 in transporting carriage 6 begins to lift and measuring ruler 9 is placed by means of a pneumatic cylinder flush with the preselected edge of sheet metal packet 1. A conventional absolute value sensor (angle pulse generator) 11 measures the angle assumed by the ruler 9, and compares it with the desired value, and rotary drive 12 as shown in FIG. 5, turns sheet metal packet 1 until actual value and desired value coincide. Since the turning angle is limited by the structural configuration, the turning cycle can be repeated as often as desired, i.e., if after the first turning process the sheet metal packet does not have the correct position, the lifting mechanism goes down, the rotary drive returns to its starting position and then the lifting mechanism lifts the packet again and a new turning process is initiated. Once the precise angle position is reached, lifting mechanism 8 goes down and measuring ruler 9 moves in the starting position. Transporting carriage 6 now moves the packet in a transporting direction (X direction in FIG. 2) transversely to a conveying direction (y direction in FIG. 2) toward the center of the feed device. After breaking photoelectric barrier 13, the carriage continues by a path length preselected according to the shape of the plate bars. This path length is automatically given by the control system so that the packet will be positioned precisely in the center of the plate bar intake. Now chain conveyor 14 transports the packet to the middle of an unstacking station 32. Here again, the path is scanned by a photoelectric barrier 15 and then the packet moves over a preselected path length, given by the control system, into the correct position in unstacking station 32.

If no suitable edge exists at one of the sides of the sheet metal packets at which their angularity or, in other words, their correct position, can be measured, a program may actuate a low-play drive mechanism 25 to automatically turn the measuring system to any one of the four sides of the packet 1.

To move packet 1 in and out in this case, the measuring system is raised by way of cylinder 17 to prevent its collision with the entering and exiting packet. For plate bar stacks in which the edge to be measured is not in the center, measuring device 16 is automatically changed, by way of a program and an adjustment drive 18, into the suitable position for scanning the packet position by means of the measuring ruler.

FIGS. 7 to 11 show the universal possibilities for placing the measuring ruler at the sheet metal packet for scanning of the correct position.

In the device according to the invention, the entire stack of plate bars can be set down roughly and is then oriented by the automatic alignment station so that the sheet metal packet is in the correct anngular position to thus be driven into the plate bar stacking station where individual plate bars are supplied to the automatic pressing and processing line. The offset in the longitudinal and transverse direction (see FIG. 2) is corrected by limiting the path of movement of the transporting carriage and of the chain conveyor. That is, the correct position in these two coordinates is determined by scanning the edge of the sheet metal packet, and this scanning signal, as a function of the path traversed, is used, by means of a program, to transport the sheet metal packet into the correct position so that the sheet metal packet lies in the correct position in horizontal axes X and Y of the unstacking station.

We claim:

1. A device for aligning a stack of sheet metal or plate bars, comprising:
    a transporting carriage movable in a horizontal transport direction, having a first vertical axis and having means for vertically supporting thereon the stack to be aligned, such that the stack has a horizontally extending edge;
    means on said carriage for lifting the stack;
    first conveyor means on said carriage for loading and unloading the stack onto and from said carriage;
    a measuring system, including
    a measuring ruler,
    means for rotatively supporting the measuring ruler adjacent the edge of the stack for rotation about a second vertical axis,
    means for moving said ruler against the edge of the stack so that said ruler adopts an angle with respect to the transport direction corresponding to the angular orientation of the stack with respect to said transport direction, and
    means for sensing the angle of said ruler; and
    means on said carriage, for rotating the stack about said first vertical axis an amount which is based on the angle of said ruler sensed by said sensing means, while lifted by said lifting means, to angularly align the stack.

2. A device as in claim 1, wherein said moving means comprises a pneumatic cylinder and said means for sensing comprises an angle pulse generator.

3. A device as in claim 1, further comprising means for pivoting said ruler a pivot angle of up to 270 degrees about said first axis so as to selectively oppose different edges of the stack.

4. A device as in claim 3, wherein said pivoting means comprises a low-play gear mechanism.

5. A device as in claim 1, wherein said first conveyor means conveys the stack in a conveying direction, said measuring system further comprises means for displacing said ruler, said supporting means, and said moving means transversely to the conveying direction of said first conveyor means.

6. A device as in claim 1, wherein said first conveyor means conveys the stack in a first conveying direction transverse to the transport direction of said carriage, the device further comprising second conveyor means for conveying the stack in a second conveying direction, transverse to the transport direction of the carriage;
    position sensing means for sensing respective positions of the stack in the transport and the second conveying directions; and
    transport and conveying direction positioning means for positioning the stack in the transport direction by transporting the stack a first distance in the transport direction on said carriage and, positioning the stack in the second conveying direction by conveying the stack a second distance in the second conveying direction on the second conveyor means, respectively based on the respective positions of the stack in the transport and second conveying directions sensed by said position sensing means.

7. A device as in claim 6, wherein said position sensing means comprises first photoelectric barriers for detecting the stack during the transport of the stack in the transport direction on said carriage, and second photoelectric barriers for detecting the stack during the second conveying of the stack in the second conveying direction on said second conveyor means.

8. A device as in claim 1, wherein said first conveyor means comprises a chain conveyor on said carriage.

9. A device as in claim 1, wherein said sensing means comprises means for comparing the sensed angle to a desired angle, said rotating means comprising means for rotating the stack about said first axis until the sensed angle is equal to the desired angle.

* * * * *